July 5, 1938.  J. A. LARGAUD  2,122,575
WINCH
Filed Dec. 12, 1936
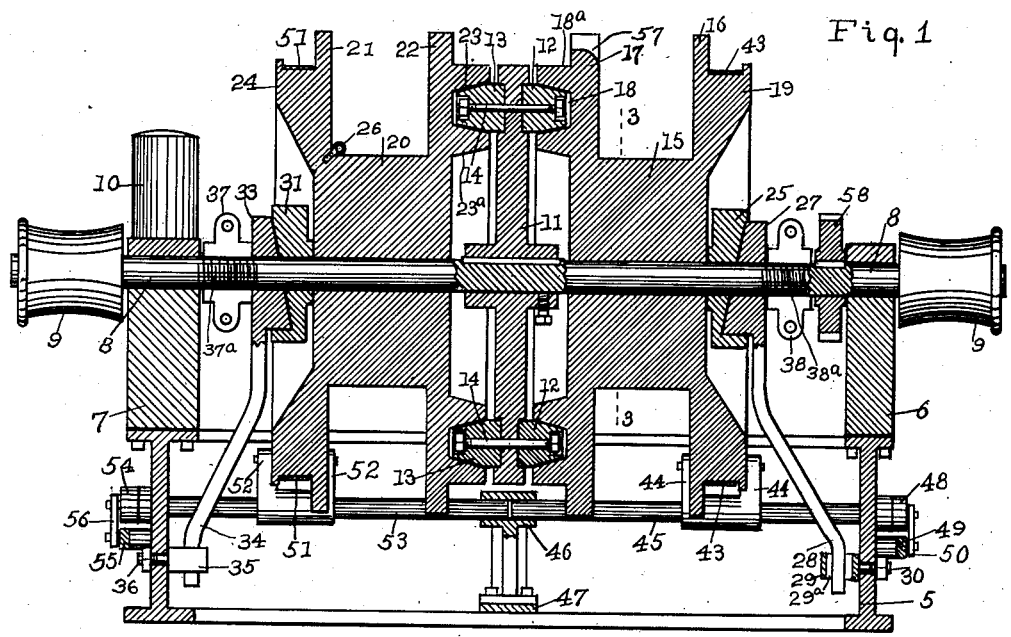
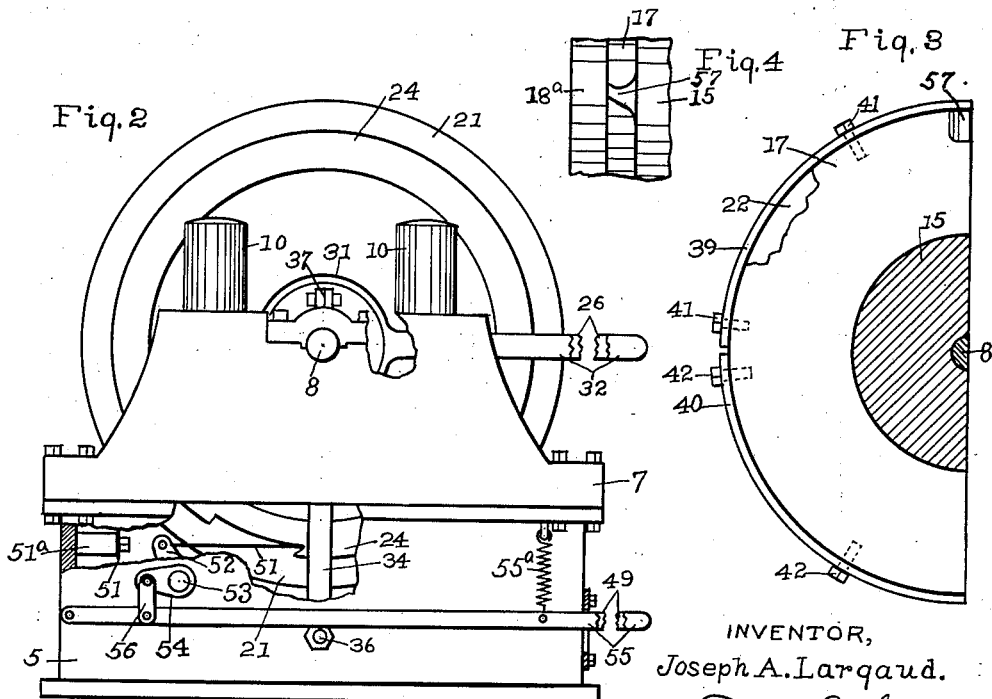
INVENTOR,
Joseph A. Largaud.
BY David E. Lain,
ATTORNEY.

Patented July 5, 1938

2,122,575

UNITED STATES PATENT OFFICE 2,122,575

WINCH

Joseph A. Largaud, Point Roberts, Wash.

Application December 12, 1936, Serial No. 115,581

2 Claims. (Cl. 254—185)

My invention relates to improvements in winches and has for an object to provide a power winch suitable for casting and hauling in large purse seins and drag nets.

The present method of operating large purse seins requires the use of a two and one-half inch manila cable. With my winch a three-eighth inch steel cable will better serve the same purpose.

Another object of my invention is to provide a power winch having two drums on one shaft with an intervening friction wheel to engage each drum separately.

Another object of my invention is to provide a separately-controllable, two-drum power winch to one of the drums of which one end of a cable may be permanently fastened and to the other drum of which the other end of the said cable may be fastened for automatic release.

Another object of my invention is to provide a power winch having two drums on one shaft with an intervening friction wheel and means to fasten the two drums together for simultaneous action.

Other objects of my invention will appear as the description proceeds.

I attain these and other objects of my invention with the mechanism illustrated on the sheet of drawing accompanying this specification, and forming a part thereof, in which Figure 1 is a side elevation of my winch in section on a vertical, medial, longitudinal plane, Fig. 2 is the left-hand end elevation of Fig. 1, Fig. 3 is a vertical cross-section of Fig. 1 on a plane through the line 3—3 of Fig. 1 showing only the drums and one half of which is broken away, and Fig. 4 is a fragmentary plan view of one of the drums.

Similar designating characters refer to similar parts in the several views. Certain parts are broken away to show other parts hidden thereby.

With more particular reference to the designated parts: A central, longitudinal, winch shaft 8 is mounted for revolution in the removable-cap brackets 6 and 7 which are fastened on the ends of the rectangular base frame 5. The ends of shaft 8 extend beyond the said bearing brackets and have fastened thereon to revolve therewith the concave spools 9, 9. Fastened on the top of the bearing bracket 7 are the tow bits 10, 10. The friction wheel 11 is centrally disposed on the shaft 8 to which it is fastened for revolution therewith. The friction rings 12 and 13 are fastened on opposite sides of the wheel 11 by the bolts 14 concentric with the shaft 8. The winch drums 15 and 20 are mounted for revolution on the shaft 8 on opposite sides of the wheel 11. Drum 15 has the outer flange 16 and the inner flange 17. On the inner side of the flange 17 is the annular recess 18 concentric with the shaft 8 and disposed to engage the friction ring 12. On the outer side of the flange 16 is the brake wheel 19.

The winch drum 20 has the outer flange 21 and the inner flange 22. On the inner side of the flange 22 is the annular recess 23 concentric with the shaft 8 and disposed to engage the friction ring 13. On the outer side of the flange 21 is the brake wheel 24. In the periphery of the flange 17 is the notch 57 and in the periphery of the core of the drum 20 is the eye 26.

The circular disc cam 25 is mounted for oscillation and reciprocation on the shaft 8 and is disposed on the said shaft with its back bearing on the outside of the drum 15 and it has the handle 26 extended horizontally forward. The circular disc cam 27 is mounted for reciprocation on the shaft 8 disposed to bear on the said cam 25 and its handle 28 is extended downward and through the slot 29ª in the block 29. The block 29 has the stud bolt 30 which is extended through the wall of the base 5 to fasten the said block 29 thereto. The construction provides for the reciprocation and prevents the oscillation of the cam 27 on the shaft 8; and the oscillation of the cam 25 on the shaft 8 by its handle 26, and also the reciprocation of the cam 25 on the said shaft when forced to by its oscillation on the cam 27.

The cam 31 is similar to the cam 25 and is mounted for oscillation and reciprocation on the shaft 8 disposed with its back bearing on the outside of the drum 20 and has the handle 32 extended horizontally. The cam 33 is mounted for reciprocation on the shaft 8 disposed to bear on the said cam 31 and has the handle 34 extended downward through a slot in the block 35, similar to the said slot 29ª. The construction provides for the reciprocation and prevents the oscillation of the cam 33 on the shaft 8; and the oscillation of the cam 31 by its handle 32, and also the reciprocation of the cam 31 on the shaft 8 when forced to do so by its oscillation on the cam 33. The block 35 has the stud bolt 36 thereon which is extended through the wall of base 5 to fasten the said block thereto.

Between the cam 33 and the bearing bracket 7 is the threaded section 37ª of the shaft 8. On this threaded shaft section is mounted the split clamping nut or stop 37 which is constructed to be operated as a nut on the said shaft to force the cam 33 against the cam 31 by being revolved on the shaft, or to be clamped to the shaft tightly, by the retaining bolts thereof, for use as a stop to limit the distance between the friction ring 13 and the cam 33. Between the cam 27 and the driving sprocket wheel 58, which is rigidly fastened on the shaft 8, is the threaded section 38a of the shaft on which is mounted the split clamping nut or stop 38 which is constructed for operation as a nut on the said shaft to force the cam 27 against the cam 25 by being revolved on the shaft; or to be clamped to the shaft tightly, by the retaining bolts thereof, for use as a stop to limit the distance between the friction ring 12 and the cam 27.

As stated, the friction wheel 11 is immovable on the shaft 8. Then, by turning the cam 25 the drum 15 may be forced toward the said friction wheel and the friction groove 18 therein may engage the friction ring 12, therein, and cause the drum 15 to revolve with the said friction wheel. In a similar manner, the friction surfaces of the drum 20 and the ring 13 may be brought into engagement by turning the cam 31 and thus cause the drum 20 to revolve with the friction ring and thus with the shaft 8.

When the wearing away of the frictional surfaces on wheel and drums makes resetting of the split nuts 37 and 38 desirable, it is attained by loosening their retaining bolts, using them as nuts, and again tightening the said bolts to clamp the nuts to the shaft when they may again serve as stops.

The above description refers to the method of operating the drums 15 and 20 separately under control of the cams 25 and 31 respectively. For operating the said drums simultaneously under the control of either of the cams 25 or 31, provision is made to fasten the said drums together by fixing on the peripheries thereof the two semicircular metal bands 39 and 40, retained in place by cap screws 41, 42 extended through holes in the said bands and into tapped holes in the flanges 17 and 22 as shown in Fig. 3.

One end of the brake band 51 is fastened to the boss 51a on the wall of the base 5, the band is then laid over the brake wheel 24 and its other end is connected with the double crank 52 fastened on the shaft 53 to oscillate therewith. The shaft 53 is mounted for oscillation, parallel with shaft 8, in a bearing in the wall of the base 5 and in a bearing 46 fastened to the bar 47 forming a part of the base 5. On the outer end of the shaft 53 is fastened the crank 54 which is connected with the pedal lever 55 by the connecting rod 56. The pedal lever 55 is pivoted on the base 5 near the rear of the rear end and extends across this end of the base to protrude beyond the same in front thereof. An extension coil spring 55a is connected between the base 5 and the said pedal lever to tend to return the lever to the position thereof which relieves the pressure of the brake band 51 on the brake wheel 24. The brake band 51 is tightened on the brake wheel 24 by pressing down on the front end of the pedal lever 55. One end of the brake band 43 is fastened to a boss on the base 5 similar to boss 51a, not shown, the brake band is laid over the brake wheel 19 and its other end is connected to the double crank 44 which is fastened on the shaft 45. The shaft 45 is mounted for oscillation, parallel with the shaft 8, in a bearing in the wall of base 5 and in the bearing 46. On the outer end of the shaft 45 is fastened the crank 48 which is connected with the pedal lever 49 by connecting rod 50. The pedal lever 49 is pivoted to the front end of the base 5 near the rear thereof and extends forward beyond the front of the machine as shown in Fig. 2. It is returned to a position which releases the pressure of the brake band 43 on the brake wheel 19 by a spring similar to and similarily installed as the said spring 55a, not shown. The construction provides for slowing or stopping the revolution of drum 15 by pressing downward on the lever 49 and for slowing or stopping the revolution of the drum 20 by pressing downward on the lever 55.

To use this winch for hauling in a purse sein, it is assumed that shaft 8 is being revolved by a driving chain engaged over the driving sprocket wheel 58. Neither this driving chain nor the prime mover operating the same are shown. One end of the purse line is engaged with eye 26 on drum 20 and this drum is revolved by oscillating the handle 32 of cam 31. When the desired length of this end of the purse line is hauled in, the other end of the purse line is engaged with the drum 15 by placing the same, which has a hook connected therewith, in the notch 57, starting the revolution of drum 15 by oscillating handle 26 of the cam 25, and continuing revolution of this drum, in connection with the continuous or intermittent revolution of the drum 20, till the purse sein is closed and brought to the desired proximity to the table on the sein boat, or completely landed thereon.

To launch a purse sein controlled by this winch, both of the drums 15 and 20 are caused to revolve in a direction opposite to that referred to above, continuously or alternately, till the said other end of the cable on the drum 15 is paid out when the engagement thereof in the notch 57 is automatically released and that end of the purse line is taken by a man in a launch or row boat. Then the paying out of the end of the purse line wound on the drum 20 is continued till a sufficient length thereof is secured to fully launch the net.

The above brief description of operating a purse sein with this winch is not intended to be complete, but enough only to show how useful the winch may be in this operation as a labor saver when compared with the methods now in use. It is also a saver of expense in connection with the purse line, for the steel cable used on the winch is far less expensive than the manila cable at present used.

When the drums 15 and 20 are fastened together by the bands 39 and 40 they are operated as a two-spool, single drum. Then they may be controlled by either of the cam handles 26 or 32 and by either of the brake pedal levers 49 or 55. When thus fastened together they are used for operating drag nets and otter trawls.

The described method of fastening the said drums together is easily applied and adds no complications to the mechanism when used without the fastening bands.

Having thus disclosed my invention, what I claim as new therein and desire to secure by Letters Patent is,—

1. A power winch including, a driving shaft mounted for revolution on a base, a friction wheel disposed centrally on the said shaft fastened thereon to revolve therewith, two winding drums, each having a flange on each end, one mounted for revolution on the said shaft on each side of the said friction wheel each drum being adapted to frictionally engage the said friction wheel, two semicircular metal bands removably disposed on the peripheries of the inner flanges of the said drums, removable mechanical means to fasten the said bands to the said flanges to connect the said drums together for simultaneous revolution in the same direction, and means to cause one of the said drums to frictionally engage the said friction wheel and revolve both of the said drums therewith.

2. A power winch including, a shaft mounted for revolution in bearings on a base, a driving wheel fastened on the said shaft adapted for mechanical connection with a source of power to revolve the said shaft, a friction wheel centrally disposed on the said shaft fastened thereon to revolve therewith, two winding drums mounted on the said shaft for revolution one disposed on each side of the said friction wheel adapted for engagement therewith for revolution thereby, two bearing stops adjustably fastened on the said shaft to revolve therewith, two disc cams through which the said shaft is extended to revolve therein attached to the said base the back of each of which bears on one of the said bearing stops, two other disc cams through which the said shaft is extended the back of each of which bears on the outer end of one of the said drums and the cam surface of each of which bears on the said cam surface of one of the said base-attached disc cams to force the said drum to frictionally engage the said friction wheel and be revolved thereby when the said other disc cam is oscillated on the said shaft, a brake wheel fastened on each of the said drums concentric therewith and revolved thereby, two brake bands each having one end fastened to the said base, each laid over one of the said brake wheels for frictional engagement therewith, having its other end connected through intervening mechanism with one of two pedal levers, the said intervening mechanisms, and the said two pedal levers each pivoted to the said base for oscillation to apply one of the said brake bands to the said brake wheel, on which it lays, to control the revolution of the said drum to which the said brake wheel is fastened.

JOSEPH A. LARGAUD.